United States Patent [19]

Landsness

[11] Patent Number: 4,552,602
[45] Date of Patent: Nov. 12, 1985

[54] HIGH—SPEED SPLICING SYSTEM FOR PREPARING PLY STOCK

[75] Inventor: Clifford A. Landsness, Akron, Ohio

[73] Assignee: The B. F. Goodrich Company, Akron, Ohio

[21] Appl. No.: 616,863

[22] Filed: Jun. 4, 1984

[51] Int. Cl.$^4$ .......................................... B65H 69/06
[52] U.S. Cl. .................................. 156/157; 156/266; 156/304.1; 156/362; 156/502; 156/512; 156/558; 156/559
[58] Field of Search ............ 156/157, 159, 266, 304.1, 156/324, 362, 421, 502, 512, 558, 559

[56] References Cited

U.S. PATENT DOCUMENTS

| | | | |
|---|---|---|---|
| 2,702,579 | 2/1955 | Perry | 156/366 |
| 3,192,094 | 6/1965 | Phillips et al. | 156/512 |
| 3,607,576 | 9/1971 | Phillips | 156/157 |
| 3,888,713 | 6/1975 | Alderfer | 156/500 |
| 4,087,308 | 5/1978 | Baugher et al. | 156/512 |

Primary Examiner—Michael Wityshyn
Attorney, Agent, or Firm—Harry F. Pepper, Jr.; Vincent A. Greene

[57] ABSTRACT

A process is disclosed for high speed automatic production of ply stock in which tire cord fabric on a first conveyor is cut by a bias cutter to form panels which are spliced at the side of said conveyor and then pulled transversely onto a second conveyor. During each cycle a cut panel is advanced by the first conveyor to a stationary transfer position where its uncut side portion is overlapped by the trailing side portion of an adjacent panel in a stationary splicing position on the second conveyor.

8 Claims, 17 Drawing Figures

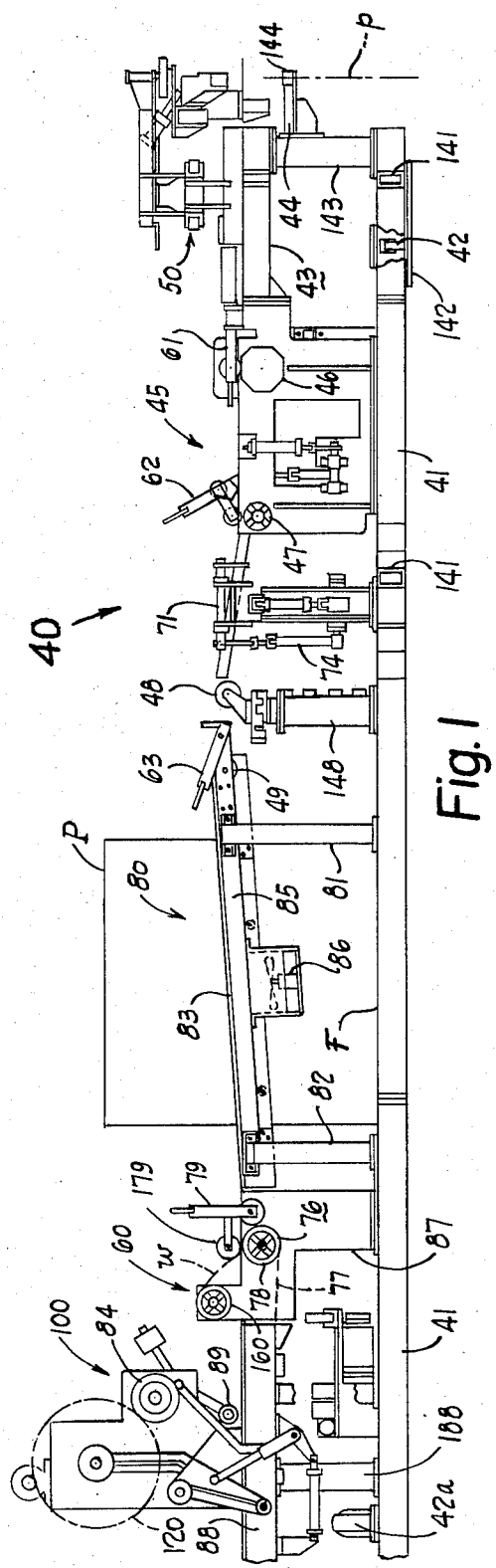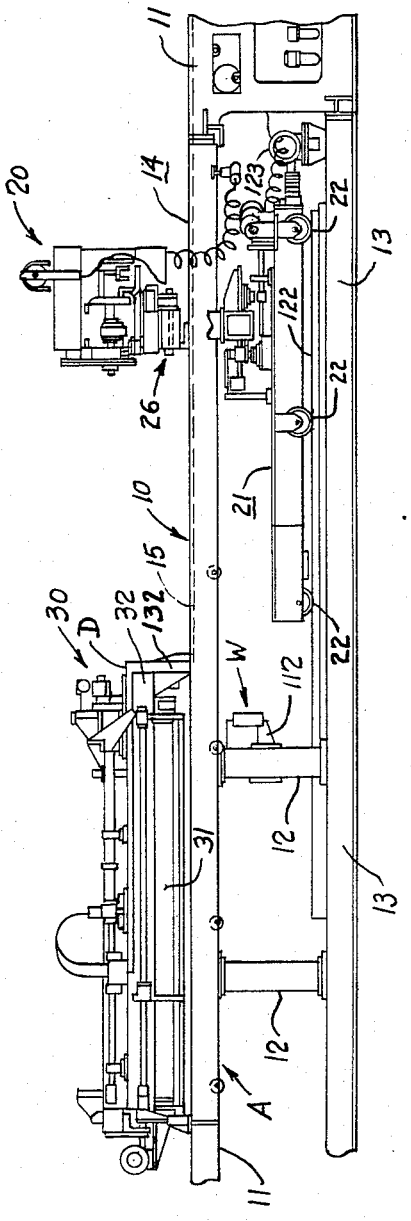

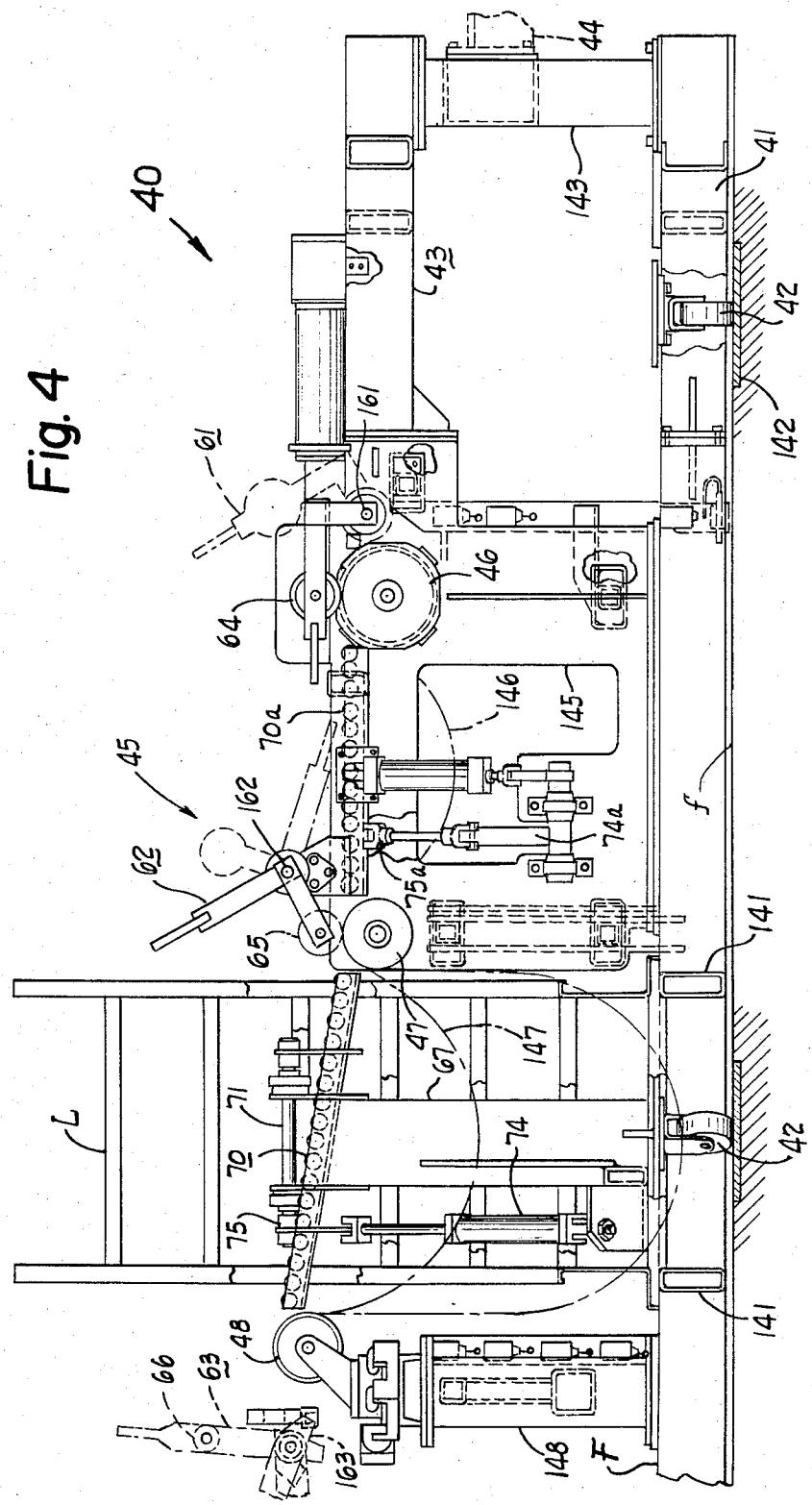

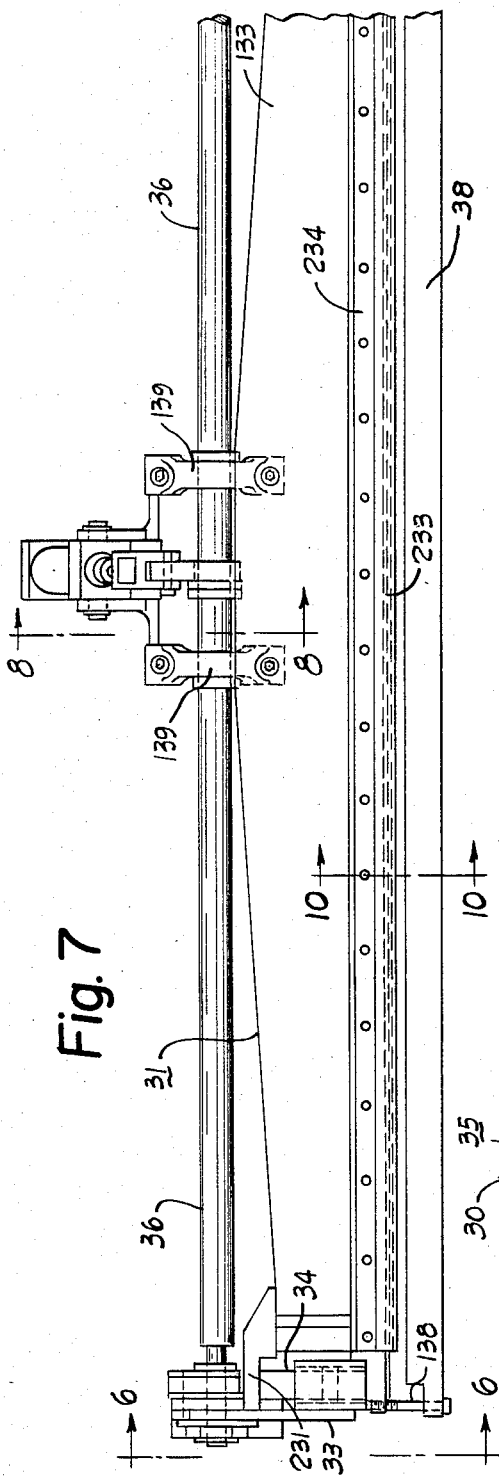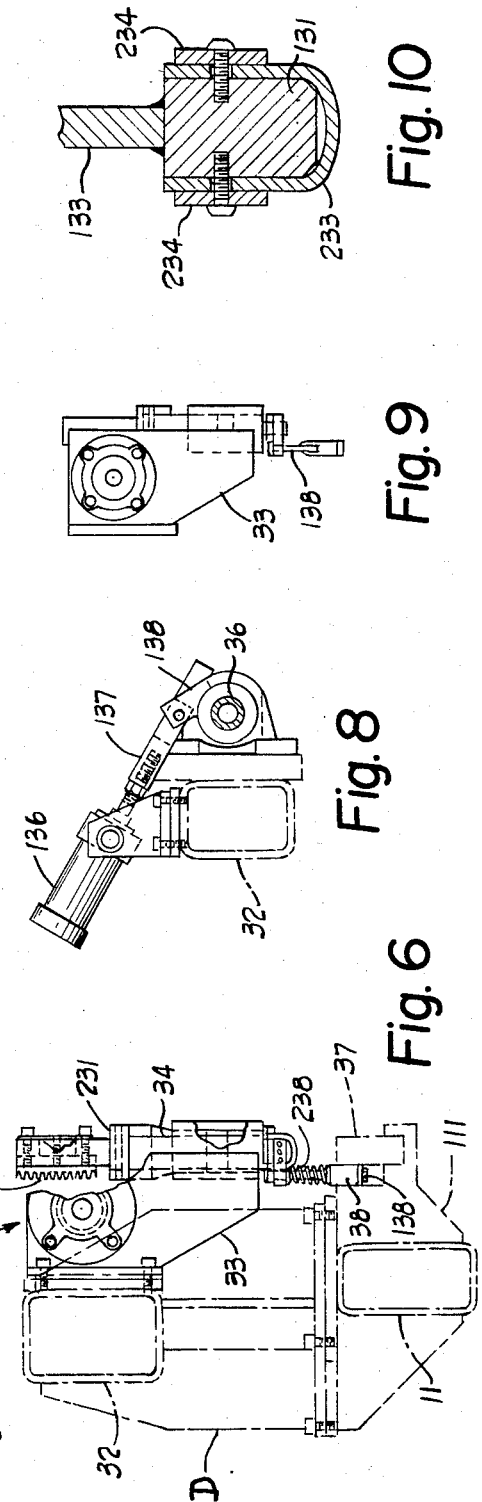

HIGH—SPEED SPLICING SYSTEM FOR PREPARING PLY STOCK

BACKGROUND OF THE INVENTION

The present invention relates to a process and an apparatus for preparing bias-cut cord fabric used as ply stock in the manufacture of pneumatic tires.

In the conventional factory process a wide sheet of tire cord fabric is passed between calender rolls and coated with unvulcanized rubber. This sheet of rubberized fabric is fed by a first cutter conveyor to an adjustable bias cutter wherein lengths of the material are cut at a bias angle to form panels of parallelogram shape, the width of the cut panels corresponding to the width of a tire ply. These bias-cut panels are then transferred manually or mechanically from the cutter to a takeaway conveyor and spliced together at their uncut side portions to form a continuous strip of ply stock with the cords extending from one side of the strip to the other. The continuous length of ply stock is stored on a supply roll and later cut or separated into individual plies at the tire building drum.

The cutting is carried out using conventional adjustable bias cutters which may, for example, be of the type disclosed in U.S. Pat. Nos. 2,962,083; 3,757,618 and 4,069,729.

The splicing may be carried out manually but is preferably performed in a lap splicer or a butt splicer which may be adjusted to accommodate fabric panels of many different sizes and bias angles. The splicer may, for example, be of the type disclosed in any one of U.S. Pat. Nos. 3,100,731; 3,130,100; 3,325,328; 3,355,343; and 3,433,690.

In the tire factory, the bias-cut panels are transferred from the cutter conveyor and/or the bias cutter to a second conveyor leading to the splicer (see U.S. Pat. Nos. 2,754,953 and 2,962,083). Such transfer can be effected manually or by use of automatic transfer means. Such means may, for example, be of the general type disclosed in U.S. Pat. Nos. 2,962,083; 3,019,018; 3,037,548; 3,077,803; and 4,087,308.

Because of the size of the bias-cut panels, the need to position the panels accurately for splicing, and other reasons, a substantial amount of time is usually required to carry out the transfer in a satisfactory manner. Automatic equipment for effecting such a transfer has heretofore been complicated and expensive because of the requirement of precision in positioning the transferred panels and the need to accommodate changes in the bias angle as well as changes in the length and width of the panels being spliced. Maintaining a reasonable rate of production is difficult with such transfer devices, and serious problems arise as the size of the cut panels is increased. When producing carcass ply stock with a width up to 4 ft., the maximum rate of factory production is about 10 to 12 panels per min. At higher speeds, maintenance problems become severe and the equipment cannot perform with the necessary degree of precision and reliability.

Problems become more severe as the size of the cut panels is increased. Generally the automatic transfer equipment is unsatisfactory when producing ply stock with a width substantially greater than 4 ft for large truck tires or off-the-road (OTR) tires. For this reason tire factories have continued to rely on manual transfer and manual splicing of bias-cut panels when producing OTR carcass ply stocks.

SUMMARY OF THE INVENTION

The present invention involves a radical departure from normal splicing procedures which makes it possible to operate automatically at a substantially higher rate of production while minimizing maintenance and labor costs. A versatile and economical process is provided which makes it possible to produce high quality bias-cut carcass ply stock with widths of 5 ft or more at production rates in excess of 20 panels per minute.

In accordance a preferred embodiment of the invention, each bias-cut panel leaving the cutter is moved by the first conveyor means to a stationary transfer position wherein the side portion of the panel is overlapped by the trailing side portion of a similar cut panel located on a second conveyor means in a predetermined stationary splicing position. The overlapped portions are spliced together by lowering the pressure bar of a lap splicer, and simultaneously the cutter is operated to begin cutting of another panel while the panels are stationary. After splicing the strip formed by the spliced panels is advanced by the second conveyor means to remove the last spliced panel from said transfer position and to transfer that panel to said splicing position. The cycle is repeated to form a continuous strip of bias-cut fabric on said second conveyor means.

The second conveyor means is mounted to swing about a fixed vertical pivot to various adjusted positions, and the bias cutter is mounted for similar angular adjustment to cut the fabric at the desired angle. The cutter is also adjustable in a longitudinal direction to vary the width of the cut fabric. The location of the splicer at the side of the first conveyor means in accordance with this invention eliminates the need for a complicated transfer device and greatly increases the rate of production while eliminating maintenance problems and maintaining the highest quality standards.

A unique feature of the invention is the provision of automatically adjustable fabric guiding means at the splicer and a special movable sensing unit which assures precise positioning of the cut panels during each splicing operation and accommodates substantial changes in the location of the panel on the cutter conveyor.

An object of the invention is to provide a simple and reliable process and apparatus for economical high-speed production of bias-cut tire cord fabric.

BRIEF DESCRIPTION OF THE DRAWINGS

The foregoing and other objects and advantages of my invention will appear more fully from the following description, made in connection with the accompanying drawings of preferred embodiments of the invention, wherein like reference characters refer to the same or similar parts throughout the several views and in which:

FIG. 1 is a side elevational view on a reduced scale showing apparatus made according to the present invention for preparation of ply stock;

FIG. 2 is a side elevational view of apparatus made according to the invention including a bias cutter and a lap splicer;

FIG. 4 is a fragmentary side elevational view of a portion of the apparatus of FIG. 1 on a larger scale;

FIG. 6 is a fragmentary elevational view on a reduced scale taken on the line 6—6 of FIG. 7 showing a portion of the splicer;

FIG. 7 is an elevational view showing a portion of the splicer;

FIG. 8 is a fragmentary vertical sectional view taken on the line 8—8 of FIG. 7;

FIG. 9 is a fragmentary elevational view of a portion of the splicer;

FIG. 10 is a fragmentary vertical sectional view taken on the line 10—10 of FIG. 7;

DETAILED DESCRIPTION OF PREFERRED EMBODIMENTS

Figure 3:
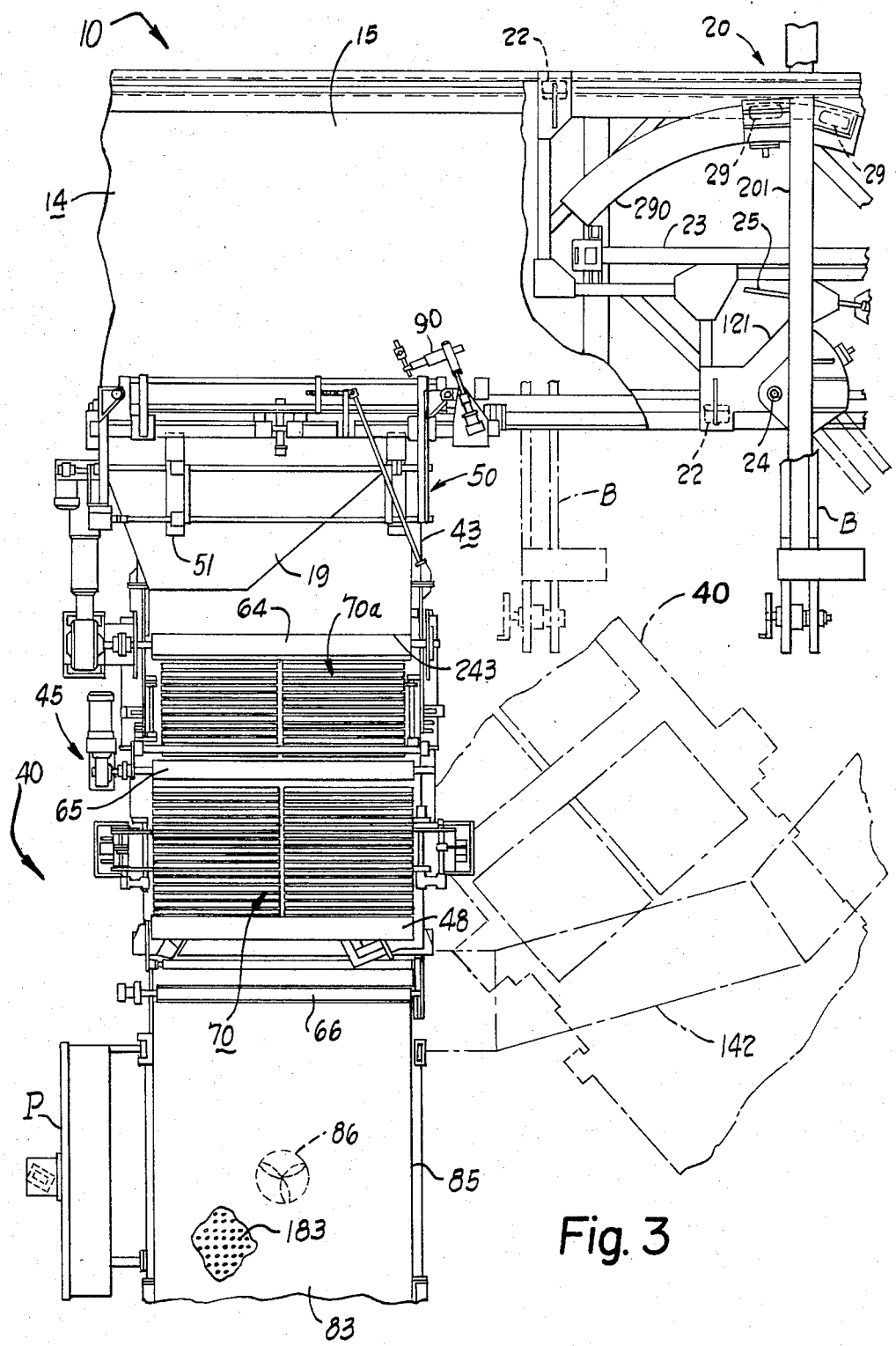
FIG. 3 is a fragmentary plan view of the apparatus on a reduced scale with parts broken away and parts shown in broken lines in adjusted positions.

Referring more particularly to the drawings, which are drawn substantially to scale, FIGS. 1 to 13 show apparatus as used in a tire manufacturing plant for producing bias-cut ply stock in accordance with a preferred embodiment of the invention. Most of the equipment for feeding and storing the ply material is of a conventional nature.

It will be understood that, unless the context shows otherwise, the terms used in describing the present invention have the meanings which would be understood by those familiar with terminology in the rubber art as indicated for example, in ASTM STP No. 184(1956).

The term "ply stock" refers to a sheet or strip of rubberized tire cord fabric suitable for use in tire building. Such fabric may be weftless and consist of rubber-covered parallel cords. Any conventional rubber-covered tire cord material commonly used as ply stock for tire building may be used in the practice of this invention. The common materials and tire building procedures used by tire manufacturers are described in Chapter 14, pages 569 to 607, of *Science and Technology of Rubber* by F. R. Eirich (1978). As indicated in this textbook, the rubber is applied to the tire cord fabric by means of a three- or four-roll calendar. The cords are usually twisted structures made from assemblies of continuous filaments formed of wire, fiberglass, rayon, nylon, aramid, polyester or the like.

The apparatus of the present invention includes a first conveyor means 10, an adjustable bias cutter 20, a lap splicer 30, a second conveyor means 40, and an adjustable guide unit 50. A continuous sheet or strip a of rubber-covered tire cord material of uniform width is mounted on the conveyor means 10 and is fed in the conventional manner to the adjustable cutter 20 where it is cut across the full width to sever all of the longitudinal cords and to separate the sheet into panels b of a predetermined size and a parallelogram shape. The longitudinal cords are formed of wire or other suitable material such as nylon, rayon, aramid, polyester or fiberglass. The cutter 20 is of a conventional type which may be adjusted angularly over a wide range, such as 40 to 90 degrees, and which may be adjusted in the direction of feed to vary the width of the cut panels.

The apparatus of FIGS. 1 to 15 is a preferred commercial embodiment of the invention for processing carcass ply stock in a wide variety of sizes. Other embodiments of the invention apply to the processing of other bias-cut sheet material, such as the belts of steel-belted radial tires and the like.

The first conveyor means 10 is controlled to feed the sheet a in predetermined increments in accordance with the width of the cuts and periodically stops to permit the regular cutting and splicing operations. The bias-cut panels b are spliced together at the splicer 30 to form a continuous strip s of ply stock which is supported and fed forwardly in increments by the second conveyor means 40 in timed relation to operation of the conveyor means 10. In accordance with a preferred embodiment of the invention, the conveyor 10 advances each panel b a predetermined distance from the cutter 20 to a stationary transfer position T on conveyor means 10 in alignment with the continuous strip s on the conveyor means 40 (see FIG. 3A). The panel b is so located in said transfer position T that the side portion aa is adjacent to the trailing side portion bb of the adjacent panel b in a stationary splicing position at the end of strip s. In the preferred embodiment shown herein, the trailing portion bb overlaps the portion aa and is supported in such a manner as to permit side portion aa to move under said trailing portion as it is fed by the conveyor means 10 (see FIG. 14).

At the start of each cycle, the pressure bar 31 of the splicer 30 is lowered against the overlapped portions to provide the splice and the cutter 20 is operated to begin the cut. Then, during the cutting operation, the second conveyor means 40 is operated to advance the continuous strip s into the festoons 146 and 147, to remove the spliced panel b from the first conveyor means 10 and to transfer the panel from the aforesaid stationary transfer position to said stationary splicing position.

Figures 3A, 4A:
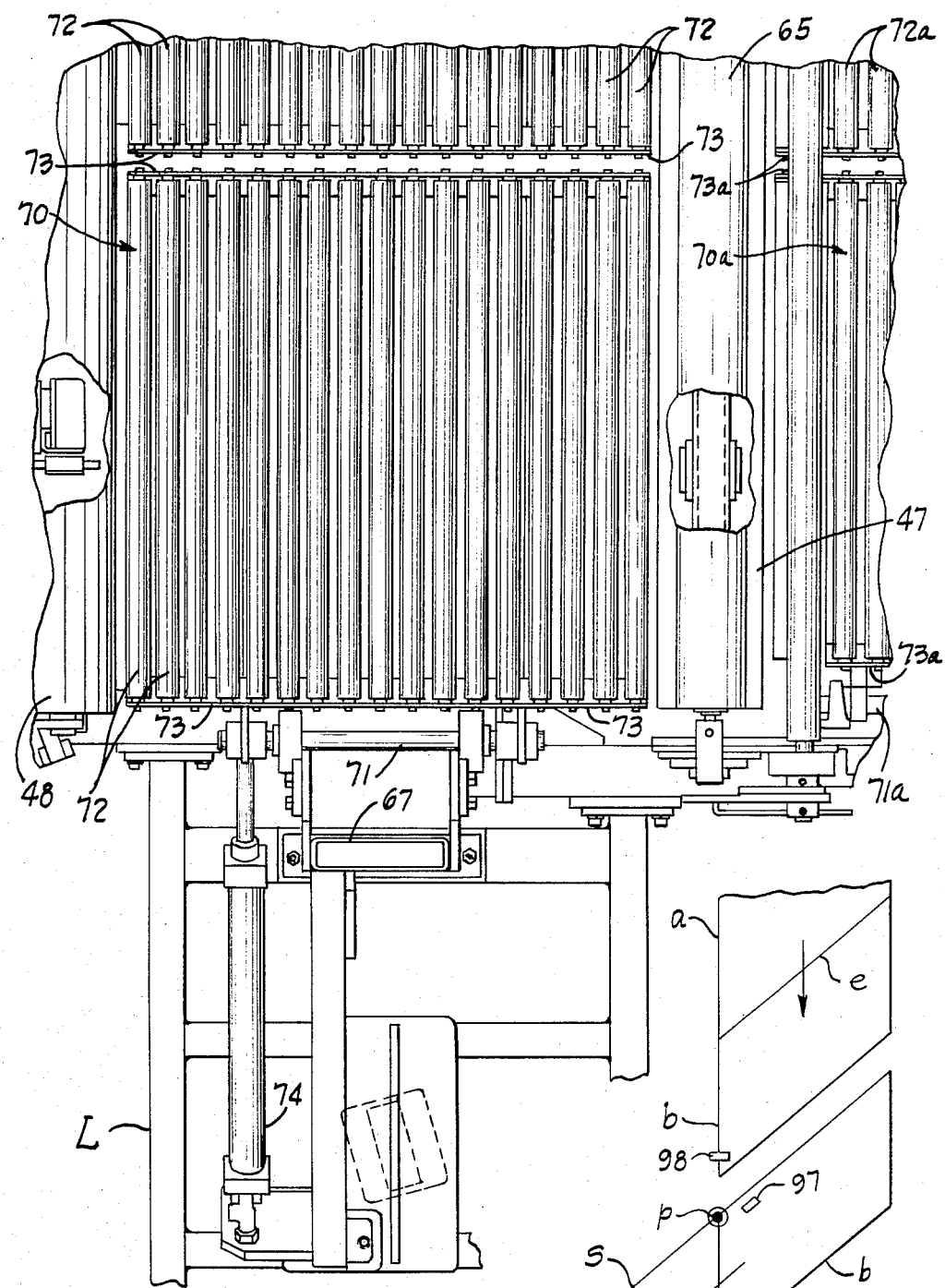
FIG. 3A is a fragmentary diagrammatic view on a reduced scale showing a modified form.
FIG. 4A is a fragmentary top view of the apparatus of FIG. 4.

The basic operation is illustrated in FIG. 3A in which sheet a is severed by the cutter 20 at line e to form a flat panel b which is thereafter advanced from the cutter 20 to the horizontal transfer position T on the cutter conveyor means 10. The cut panel b may be advanced in the conventional manner faster than the sheet a so that it is spaced from the sheet when it arrives at the transfer position as indicated in FIG. 3A. While in that position, the overlapped uncut side portions are pressed and adhered together by the pressure bar 31 to form the narrow lapped joint g.

At the start of a typical 3-second cycle, the operation of the cutter 20 and the splicer 30 is initiated simultaneously. After about one-half sec. the splicer bar 31 is lifted and the drive roll 46 is operated to move the spliced panel from the transfer position T to the aforesaid splicing position before the middle of the cycle. About 1.2 to 1.5 sec. from the start of the cycle, the spliced panel arrives at said splicing position, the roll 46 is stopped, the cutting operation is completed, and operation of the cutter conveyor is initiated. During the last half of the cycle or for about 1.5 sec, the spliced panel remains stationary in said splicing position as the cut panel is advanced by the cutter conveyor to the transfer position T.

The mode of operation described above is the same for various embodiments of the invention regardless of the bias angle. The splicer and takeaway conveyor may be located on either side of the cutter conveyor means 10. For example, the takeaway conveyor means 40 of FIG. 1 can be constructed to pivot either toward the bias cutter 20 as in the embodiment of FIG. 3 or away from the cutter as in the embodiment of FIG. 3A.

Although the equipment as shown is intended for cutting at bias angles from 45 to 90 degrees, it can readily be modified by replacing the bias cutter 20 with a cutter capable of cutting at angles substantially less than 30 degrees. For instance, with a different bias cutter and a few minor changes in the guide unit 50, the apparatus of the present invention can be made to function effectively when adjusted for cutting and splicing at bias angles from 80° to 20° or less.

The first conveyor means 10 is generally of conventional construction with a conventional rigid metal frame A having a long beam 11 supported in a horizontal position by a series of vertical legs 12 and a lower horizontal beam 13. The conveyor means includes a conventional belt conveyor or cutter conveyor 14 having a long endless belt 15 with a uniform width slightly less than the lateral distance between beams 11 which is supported in a horizontal position on cylindrical rolls (not shown) near the opposite ends of the conveyor.

A continuous sheet or strip a of rubber-covered tire cord fabric of uniform width is delivered from a supply roll (not shown) to the belt 15 of the cutter conveyor 14 and is supported on the belt as it travels to the bias cutter 20. The sheet a may, for example, be a conventional weak-weft or weftless tire cord fabric with regularly spaced parallel longitudinal tire cords formed of wire or synthetic fiber filaments. A conventional electric motor driving the conveyor 14 causes the tire cord material to be advanced in increments in a predetermined cycle. The conventional equipment associated with the conveyor means 10 and the adjustable bias cutter 20 is well known and by itself forms no part of the invention. Equipment of this general type has been in use in tire factories for several decades.

The cutter used in the practice of this invention may be of the general type shown, for example, in U.S. Pat. Nos. 3,924,503; 4,069,729 and 4,406,201. The type of cutter employed for the bias cutting operation is not critical.

As herein shown the bias cutter 20 has a rigid frame B pivotally mounted for angular adjustment on a movable carriage or trolley 21. A series of wheels 22 permit the carriage to move in a longitudinal direction on tracks 122 carried by the horizontal beams 13 of the cutter conveyor frame A. The longitudinal position of the carriage is adjusted by rotating a long adjusting screw 23 driven by an electric motor 123 (FIG. 2). Thus, when it is necessary to change the width of cut, the frame B can be moved from the position shown in solid lines in FIG. 3 to the position shown in broken lines in that figure.

The carriage 21 has a rigid frame 121 with a fixed pivot support 24 providing a vertical pivot axis 124 about which the frame B swings when the bias angle is adjusted. An adjusting screw 25 extends through an internally-threaded pivoted bracket 125 of the frame B to effect the desired angular adjustment. The screw is driven by an electric motor 225 to cause the frame B to swing at least 45 degrees about the axis 124 to various fixed adjusted positions such as the one shown in broken lines in FIG. 3. The equipment is adapted to provide bias cuts from 40° to 90° relative to the edge of the sheet a. The portion of the frame remote from the pivot 24 is supported on a pair of wheels 29 which roll on the flat arcuate plate 290 of the carriage 21 to facilitate the desired adjustments.

Figure 5:
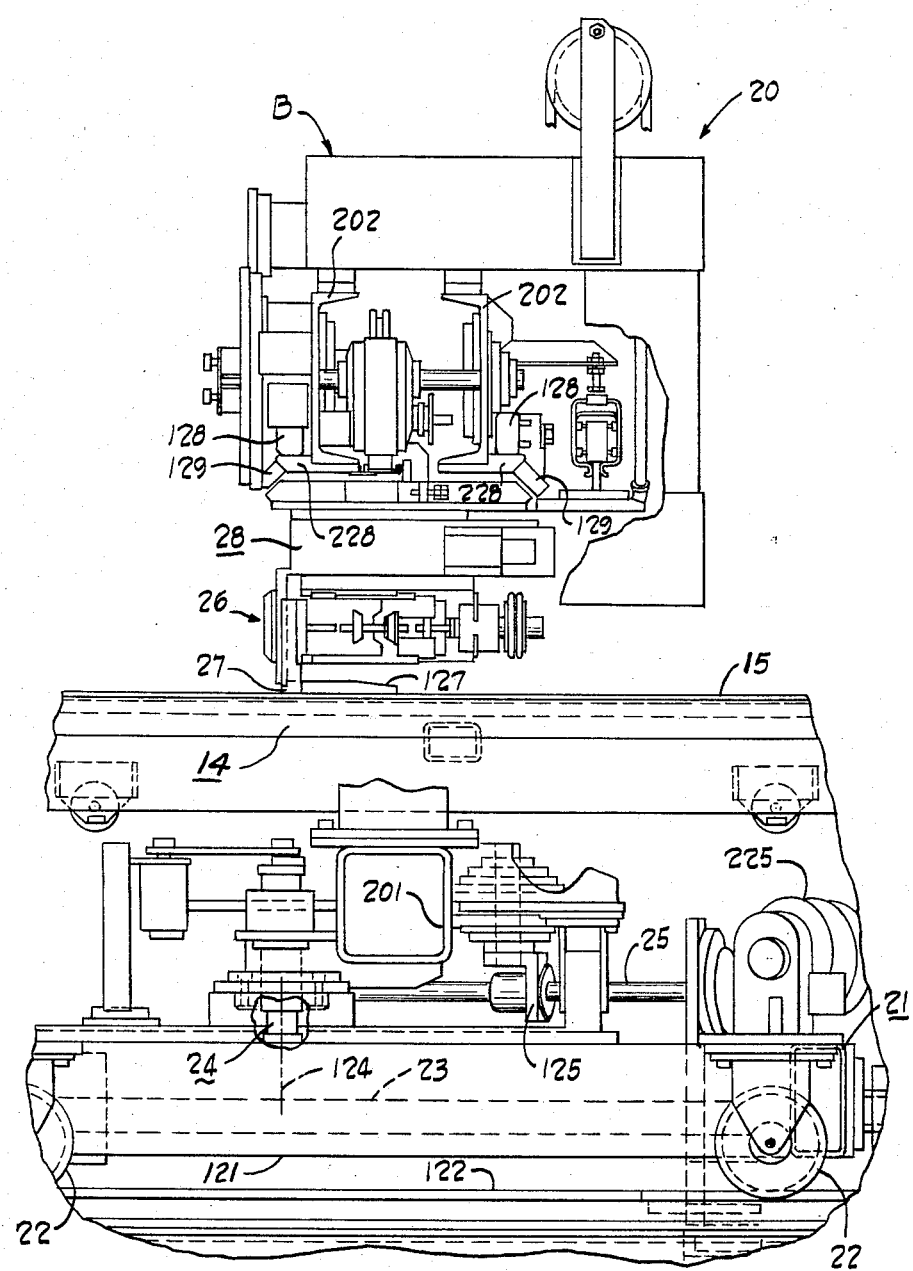
FIG. 5 is a fragmentary side elevational view of a portion of the apparatus of FIG. 2 on a larger scale.

The cutter shown herein has a conventional rotary cutter head assembly 26 which may be of the type disclosed in U.S. Pat. No. 4,406,201. The assembly includes a motor-driven cutter blade 27, a transverse guide bar 127 similar to that of said patent, and a cutter carriage means 28 supported for lateral movement on guideways 228 by a series of wheels 128 and 129 (FIG. 5). The lower box beam 201 and the parallel upper beams 202 of the frame B rigidly support the guideways 228 in positions parallel to the box beam 201. The arrangement permits cutting of the sheet a across the full width in all of the adjusted positions.

Conventional equipment (not shown) is provided for supplying the tire fabric to the cutter conveyor including a supply roll and means for continually feeding the sheet a from the roll to said conveyor while forming festoons that vary in length to accommodate the intermittent feed to the cutter 20. Various means may be employed to guide the sheet and automatically position it as it moves to the conveyor 14 so that its edge has a predetermined position on the conveyor belt 15 parallel to the side edge of the belt. A high degree of accuracy is not required. The centering or positioning of the sheet a can, for example, be effected in a conventional manner by means which provides lateral adjustment of the portions of the sheet a approaching the conveyor 14 under the control of sensors which locate the position of one side edge of the sheet (i.e., in a festoon). It is important that the sheet a be located on the belt 15 with its side edge parallel to the side edges of the belt 15 and to the direction of feed and in a proper position relative to the cutter 20 and the pressure bar 31 of the lap splicer. However, the present invention eliminates the need for a high degree of precision in locating the sheet a as it moves into belt 15 so that an error of 3 or 4 millimeters (mm) is not significant.

The invention also compensates for lack of precision in the belt conveyor 14 and the typical side-to-side movements or vibrations of the belt 15 which may sometimes be up to 8 mm and is more frequently in the range from about 2 to about 4 mm in the vicinity of the splicer. Guides are usually provided near opposite ends of the cutter conveyor to help center the belt, but they cannot prevent the side-to-side movement which tends to interfere with proper positioning of the bias-cut panel b in the desired transfer position T (FIG. 3A).

The accuracy is affected somewhat by the width and weight of the rubberized fabric sheet a fed to the conveyor 14 from the supply roll. Each supply roll is replaced when all of the tire cord fabric is used up and can be replaced by a roll containing fabric of a different width. The widest sheets a can present more of a problem with respect to accuracy because of the greater weight and also because of greater variation in width along the length of the sheet and more opportunity for formation of wrinkles during feeding.

The various factors referred to above make it impossible to locate each cut panel b in an exact transfer position T at the time of splicing. The actual position of the cut panel may be laterally offset from the desired transfer position (FIG. 3A) by 5 mm or more in either direction. Such gross inaccuracy could not be tolerated if it resulted in excessive overlap at the spliced joint. The present invention solves that problem.

FIGS. 1 and 4 show the second takeaway conveyor means 40 which has a rigid frame F including a pair of long horizontal beams 41 connected by a series of transverse beams 141 and supported a small distance above the floor f on a series of wheels 42. The frame supports a takeaway table 43 having a pair of vertical legs 143 and a flat rectangular plate 243. One leg is rigidly connected to a bracket 44 having a pivotal connecting means 144. The latter provides a pivotal connection W between the main frame F of the conveyor means 40 and the main frame A of the conveyor means 10 at bracket 112 so that the frame F can swing at least 40 degrees about a vertical pivot axis p (see FIGS. 1, 3 and 13) to various adjusted positions. One of those positions is shown in broken lines in FIG. 3. The frame F may, for example, be constructed to swing at least 45 degrees from the position shown in solid lines in FIG. 3 to permit bias cuts from 45 to 90 degrees or more. The wheels 42 rest on flat floor plates 142 which facilitate rolling in an arcuate path during angular adjustment of the heavy frame F.

The frame F and associated parts of the conveyor means 40 supported by the wheels 42 have a weight of several thousand pounds. To faciliate adjustment of their angular position relative to the cutter conveyor, means are provided for driving one or more of the wheels. For example, a drive wheel 42a may be provided as indicated in FIG. 1 having a rubber tire for engaging the floor, and an electric motor may be provided to rotate the wheel when an adjustment is being made.

Figure 13:
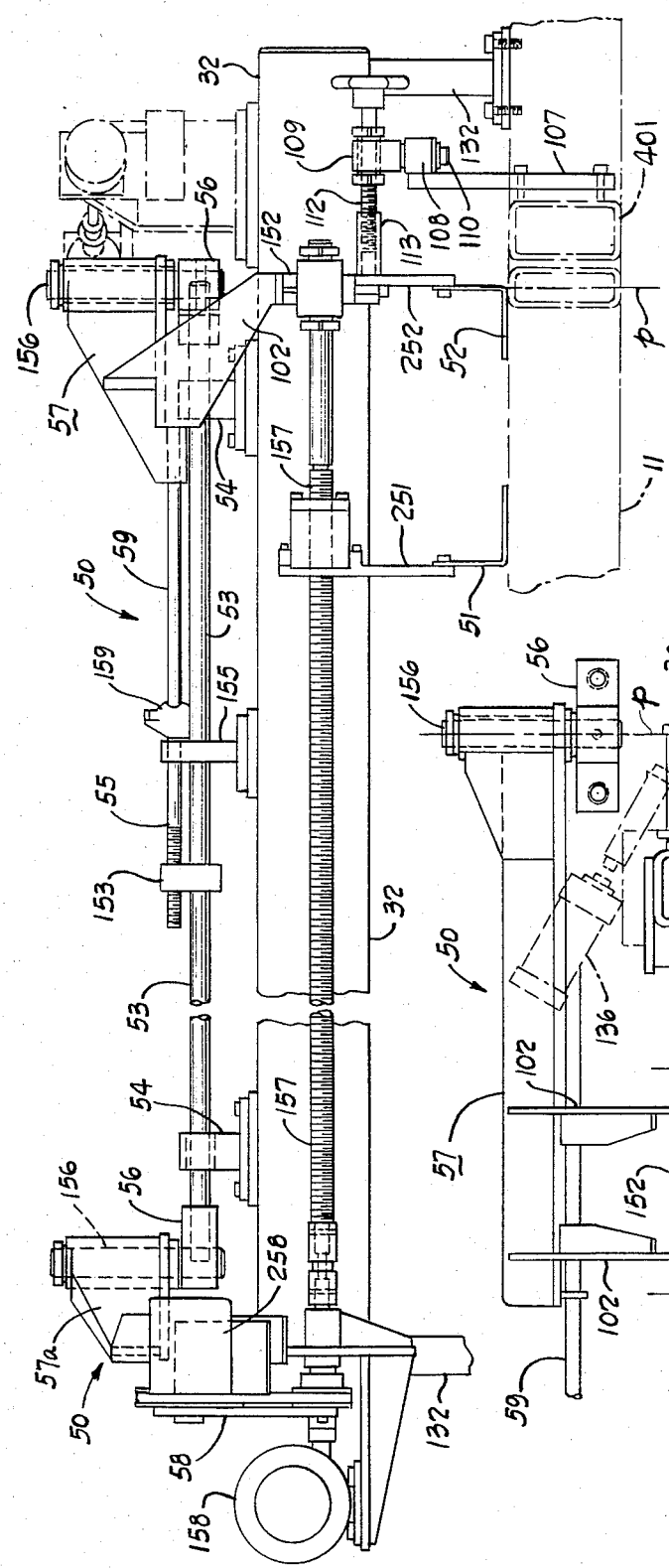
FIG. 13 is a foreshortened fragmentary side elevational view of the apparatus in the vicinity of the splicer including an adjustable guide means.
Figure 14:
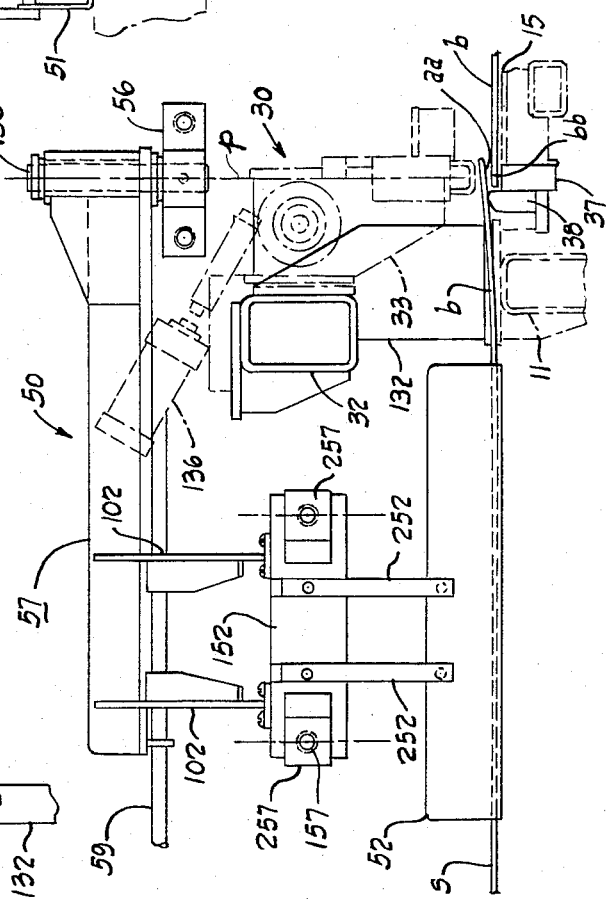
FIG. 14 is a fragmentary end elevational view of the apparatus of FIG. 13 with parts shown in broken lines.
Figure 15:
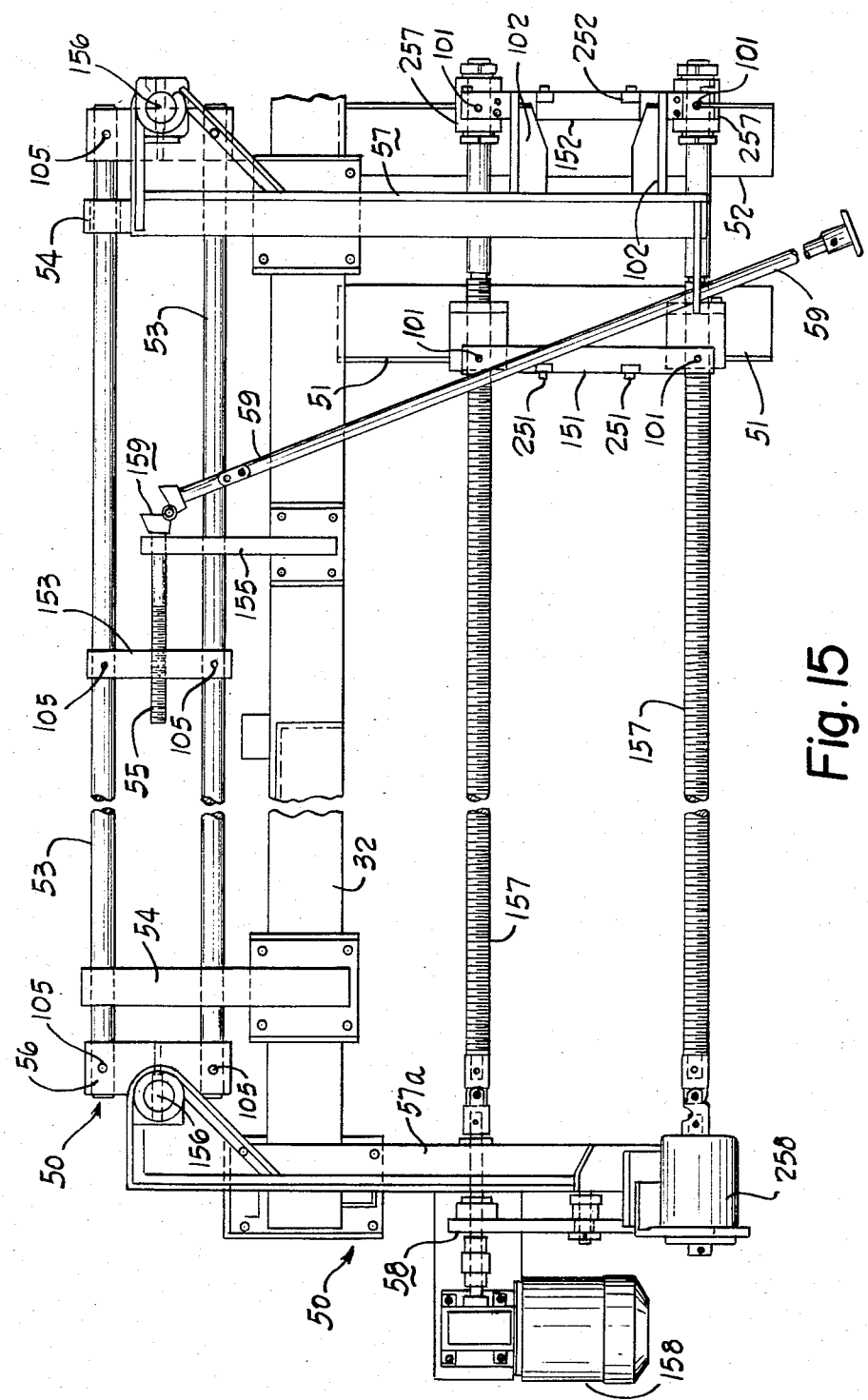
FIG. 15 is a foreshortened top view of the adjustable guide unit of FIG. 13.

FIGS. 13, 14 and 15 show the details of the adjustable fabric guiding unit 50 which has a frame rigidly supported above the main frame of the cutter conveyor unit 10 adjacent to the splicer 30 and guides 51 and 52 for engaging opposite side portions of each bias-cut fabric sections as it moves away from the splicer. The frame includes a pair of parallel horizontal rods 53 carried on a pair of transverse support arms 54 rigidly connected to the longitudinal beam 32 of the cutter conveyor unit. The rods are connected by an internally-threaded transverse bar 153 which can be adjusted in either direction by an adjusting screw 55 carried by a rigid transverse bar 155.

Pivot members 56 are provided at opposite ends of the rods 53 with vertical pivot pins 156. A pair of similar cantilever arms 57 and 57a are mounted on the pivot pins 156 and arranged in parallel positions to swing in unison to angularly adjusted positions corresponding to the bias angle of the cut fabric. Adjustable screw means extend between the arms 57 and 57a to hold them in parallel position including a pair of long adjusting screws 157 which carry the guide 51.

The screws 157 extend through blocks 257 mounted on vertical pivot pins 101 in the bifurcated end portions of support members 151 and 152 (see FIG. 15). The latter are connected by two pairs of vertical bars 251 and 252 to the guide 51 and 52, respectively. The support member 151 has internally threaded blocks 257 which move in response to rotation of the screws 157 to adjust the position of the guide 51. The support member 152 is rigidly supported in a fixed position by a pair of brackets 102 extending downwardly from the cantilever arm 57.

Drive means 58 are provided to effect automatic adjustment of the guide 51, for example from the position shown in FIG. 15 to the position shown in FIG. 3. The drive means is supported by the pivoted cantilever arm 57a to swing in unison therewith and includes an electric motor 158 and associated means for rotating the two adjusting screws in unison and a sensing unit 258 which keeps track of the position of the guide 51. A computer-controlled electrical control system may be provided to control the motor 158 and to provide the adjustment automatically in accordance with the size of the bias-cut fabric panels.

Further adjustment is effected by a manual turning of a long rod 59 which is operably connected to the adjusting screw 55 by an articulated connector 159 adjacent to the support bar 155. By turning the rod 59 the entire frame is adjusted in a longitudinal direction relative to the beam 32. The adjustment is desirable at certain bias angles because of the action of the cords tending to move the bias-cut fabric piece transversely as it slides across the sheet metal plates 103 and 104 (FIG. 3).

The frame of the fabric guide unit 50 has pivoted joints and a parallelogram arrangement with vertical pivots to permit angular adjustments in excess of 45°. The members 56 and 153 are pivotally mounted on the rods 53 by vertical pivot pins 105 similar to the vertical pins 101 at the supporting members 151 and 152 to permit such angular adjustment.

The vertical pivotal axes of the pivot pins 156 is located substantially in the same plane as the edge of the fabric on the conveyor means 10. The vertical axis of pin 156 for the cantilever arm 57 is in alignment with the vertical axis p of the pivotal connection W between the main frame A of cutter conveyor unit 10 and the main frame F of takeaway conveyor 40. With this arrangement the cantilever arm 57 and other portions of the frame of the guide unit 50 including the guides 51 and 52 can be arranged to swing about the axis p and to remain parallel to the main beams 41 of the frame F.

In a preferred embodiment of the invention the arm 57 and the frame F are operably connected to turn in unison about the axis p. As shown in FIG. 13 the longitudinal beam 401 of the table 43 is rigidly connected to a vertical support member 107 having an upper portion 108 pivotally connected to a block 109 by a vertical pivot pin 110. A manually operated horizontal adjusting screw 112 extends through said block into an internally-threaded member 113 which is operably connected to the support bar 252. With this arrangement the connection between the arm 57 and the beam 4 is subject to fine manual adjustment to assure that the guides 51 and 52 are set at the proper angle for optimum performance.

A variety of different lap and butt splicers can be used in the practice of this invention including those of the type shown in U.S. Pat. Nos. 3,100,731; 3,130,100 and 3,433,690. The details of the splicer form no part of this invention, but it is important to provide a splicer capable of the operating at high speed so as to maintain the desired high rate of production. As indicated in U.S. Pat. No. 3,130,100, conventional lap splicing techniques have sometimes been relatively slow.

The lap splicer 30 has a rigid frame D including a horizontal box beam 32 supported in a position parallel to the main beam 11 of the conveyor means 10 by legs 132 at opposite ends of the beam. The frame includes brackets 33 having means for mounting vertical guide pins 34 at opposite ends of the pressure bar 31. Yokes 231 at opposite ends of the bar are mounted on the pins so that the pressure bar 31 can reciprocate in a vertical plane. A rack-and-pinion drive means 35 is provided at each end of the splicer to raise and lower the pressure bar in response to rotation of a long horizontal rod 36 extending the length of the bar 31.

A double-acting air cylinder 136 is pivotally mounted on the central portion of the beam 32 to effect turning of the rod 36 and to cause the desired vertical reciprocation of the pressure bar 31. The piston rod 137 of the cylinder is pivotally connected to a bracket 138 which is rigidly connected to the rod 36 to cause turning of the rod is response to reciprocation of the piston. Journal means 139 carried by the beam 32 provide bearings to locate the rod 36 and resist the lateral force exerted by the air cylinder.

Electrical control means (not shown) are provided to cause operation of the air cylinder and reciprocation of the pressure bar 31 in timed relation with operation of the bias cutter in a predetermined cycle of operation. The rate of operation of the cutter and the splicer may be from 15 to 25 or more cycles per minute and is typically in the range of 18 to 22 cycles per minute.

The pressure bar 31 comprises a thick straight horizontal steel bar 131 of uniform rectangular cross-section welded to a narrow flat metal plate 133 which extends the full length of the bar between the end yokes. The bar 131 is covered by a relatively thick strip 233 of rubberized fibrous material, leather or other suitable cushioning material which provides a replaceable pressure pad extending the full length of the bar. The strip is bent around the bar and held in place by narrow removable metal strips 234 as indicated in FIG. 10.

Directly below the pressure bar 31 there is provided a long anvil 37 consisting of a steel bar of uniform rectangular cross-section rigidly supported on the main beam 11 by spaced brackets 111 (FIG. 6). The anvil is parallel to the beam 11 and to the bar 131 and has a flat upper surface located (FIG. 14) in the plane of the belt 15 to engage and support the uncut marginal portion bb of the panel b in the transfer position T (FIG. 3A). The anvil has a length of 5 ft or more and extends the full length of the splicer 30 to effect splicing along the full width of the panels b. The flat horizontal upper surface of the anvil 37 and the bottom horizontal surface of bar 131 are normally spaced vertically a distance from 3 to 4 cm to provide a narrow space to receive the bias-cut fabric and preferably have a width of from 2 to 3 cm (cm) to accommodate substantial variations in the positions of the cut panels b on the conveyor belt 15.

Because of the overlap a unique mechanism is required to lift the trailing side portion aa of each spliced panel b as it approaches the splicer and to hold it in an elevated position as the side portion bb of the next panel moves over the anvil to the transfer position T (FIG. 3A). As indicated in FIGS. 6 and 14 such lifting is effected by a long horizontal floating bar 38 of rectangular cross-section which reciprocates vertically with the pressure bar 31. The bar 38 extends the full length of the splicer 30 and slidably engages the vertical face of the anvil 37. The bar 38 is yieldably supported at its opposite ends by vertical supporting pins 138 having helical springs 238 compressed between the bar and supporting brackets at the ends of the bar 31, whereby the bar 38 moves vertically to an upper advanced position shown in FIG. 14 to lift the panel portion aa when the pressure bar 31 is lifted and then moves downwardly into a shallow recess adjacent the anvil to a lower retracted position wherein the upper surface of bar 38 is near and parallel to the horizontal plane containing the fixed upper surface of the anvil 37.

During each splicing operation, the spliced panel 6 on the table 43 adjacent the splicer is supported in a predetermined horizontal splicing position by the flat top plate 243 and by the flat horizontal plate 19 supported from the beam 11 of the conveyor means 10. These two plates slidably engage each other during angular adjustments, the trapezoidal plate 19 covering the gap between the table 43 and the conveyor means 10 in all of the adjusted positions.

A special festoon unit 45 is provided for controlling delivery of the strip s of ply stock from the takeaway table 43 to an air flotation table 80 and for causing movement of the strip in festoons whose length changes to accommodate the intermittent motion associated with the periodic splicing operations.

The festoon unit 45 has upright posts 67, a ladder L, and a rigid supporting frame 145 mounted on the frame F and has motor-driven rolls for feeding the ply stock to the table 80. As shown herein, a horizontal motor-driven takeaway roll 46 and a motor-driven drive roll 47 are mounted on the support 145, and a conventional freely rotating camber roll 48 is mounted on an upright support 148 with its axis parallel to the rolls 46 and 47. The festoon drive roll 47 is operated in in response to lowering of the festoon 146 between rolls 46 and 47 to feed the strip s into a festoon 147 (see FIG. 4). The camber roll is automatically controlled to center the strip as it is fed to the table 80. A motor-driven roll 49 is provided at the end of the air flotation table, and conventional pressure roll units 61, 62 and 63 are mounted above the driven rolls 46, 47 and 49, respectively, to swing about pivot shafts 161, 162 and 163. They support pressure rolls 64, 65 and 66 which swing into and out of engagement with the driven rolls.

In accordance with the invention, a window-shade unit 60 is provided having a belt w which is advanced to the cutter conveyor and adhered to the cut fabric panel whenever the machine is restarted after adjusting the bias angle. Retractable roller means are provided on the festoon unit 45 to provide a temporary support for the belt w between the rolls 46 and 48 including retractable dual roller trays 70 and 70a which are normally in lowered positions out of the way of the festoons 146 and 147. The dual trays are arranged to swing about horizontal pivot shafts 71 and 71a at opposite sides of the festoon unit from their normal retracted positions to raised operative positions as shown in FIGS. 3 and 4.

When raised, the rollers 72 and 72a of the dual trays are supported in horizontal positions between pairs of side bars 73 and 73a, respectively. Each tray is formed in two separate sections of the same size, and each section is operated by an air cylinder 74 or 74a controlled manually or semiautomatically by an electric control means (not shown). As indicated on FIG. 4A, each half of the roller tray 70 is rigidly connected to a horizontal pivot shaft 71 which is actuated by a pneumatic cylinder 74 having a connecting means 75 joining the piston rod to the pivot shaft. Each half of the tray 70a is operated in a similar manner on a pivot shaft 71a by a power cylinder 74a and an associated connected means 75a.

As inclined air flotation table 80 is supported on the main frame F in an inclined position by vertical legs 81 and 82 and has a flat rectangular upper plate 83 with regularly spaced rows of closely spaced perforations 183. A rectangular pan 85 below the plate 83 forms a closed air chamber which receives air under pressure from a motor-driven fan 86. The air pressure in pan 85 forces air through the perforations to provide major support for the strip s of ply stock so that it may be readily moved by an operator whenever manual repair of splicing operations are needed. A horizontal driven roll 49 is provided at one end of the flotation table 80 to assist in moving the ply stock over the table.

A conventional windup unit 100 is mounted on the frame F of the conveyor means 40 to receive the ply stock from the flotation table 80. A conventional endless belt conveyor 76 is provided to feed the ply stock to two or more windup stations spaced along the length of the conveyor. A rigid frame is provided for the conveyor 76 including horizontal beams 88 supported on the main beams 41 by vertical legs 188 and an upright end support 87. The windup conveyor comprises a wide endless belt 77 mounted on horizontal cylindrical rolls 78 near opposite ends of the beams 88. One of the rolls 78 and a pressure roll unit 79 are mounted on the end support 87. The unit 79 is pivotally mounted like the unit 61 and has a pressure roll 179 for engaging the upper surface of the ply stock on the roller 78.

The window-shade unit 60 has a motor-driven cylindrical roll 160 rotatably supported in a horizontal position between the vertical side plates of the end support 87 and has a thin flexible fabric belt w of light-weight construction which wraps around the roll for storage when retracted and which when extended is long enough to extend from roll 160 to the middle of the conveyor belt 15 of the first conveyor means 10. The end portion of the belt w is preferably formed of rubberized fabric having a surface which will adhere to the uncured rubber of the bias-cut panel on the conveyor 14. If desired the entire belt w may be formed of a thin light-weight rubber-covered fabric.

In the practice of the present invention, when the bias angle is changed and the angular position of the conveyor means 40 is adjusted, it is necessary to restart production of ply stock and to employ the window shade belt w. Before or during unwinding of that belt from the storage roll at 160, the two festoons 146 and 147 are eliminated between the rolls 46 and 48 and the power cylinders 74 and 74a are actuated to swing the roller trays 70 and 70a to their advanced upper positions as shown in FIGS. 3 and 4. The belt w is advanced from the roll 160 over the second conveyor means 40 and under the bar 30 of the lap splicer 30 to a bias-cut panel b in the proper transfer position on the belt 15. The end portion of the belt w overlapping the panel is temporarily spliced or adhered to the panel by applying a downward pressure. The belt w functions like ply stock on the conveyor means 40 to cause incremental advancement of the spliced bias-cut panels from the cutter conveyor 14 to the conveyor means 40. When the ply stock reaches the pressure roller 179 at the end of the windup conveyor, the belt w is manually separated from the ply stock and the stock is then fed over the conveyor belt 77 in the conventional manner to one of the windup units 80 where it is guided under roll 89 and around roll 84 to the storage roll 120. The roller trays 70 and 70a are retracted by operation of the power cylinders 74 and 74a to allow the ply stock to form the festoons 146 and 147 as indicated in broken lines in FIG. 4.

The apparatus of the present invention is unique because of the elimination of the need for a transfer device to move bias-cut panels from the cutter conveyor to the discharge conveyor, the location of the splicer adjacent to the cutter conveyor, and the provision of special control means for accurately positioning the panels to assure that the splices are of optimum quality. The panels are located with a degree of precision suitable for use of butt splicing, but lap splicing is usually preferred to increase the normal rate of production (for example, to obtain a normal rate of 20 or more per minute in equipment of the type illustrated where the conveyor belts of the conveyor means 10 and 40 have widths of 4 to 5 ft or so).

Figure 11:
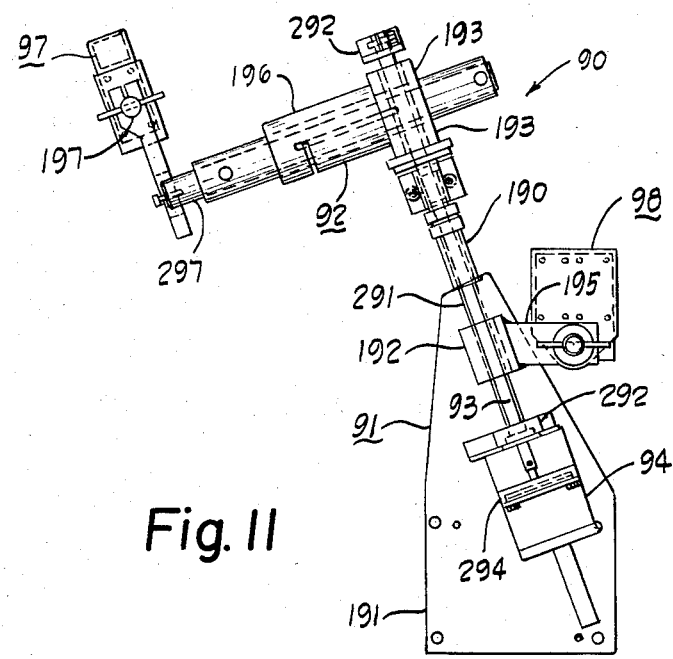
FIG. 11 is a fragmentary top view showing portions of the apparatus for controlling the position of the ply material.
Figure 12:
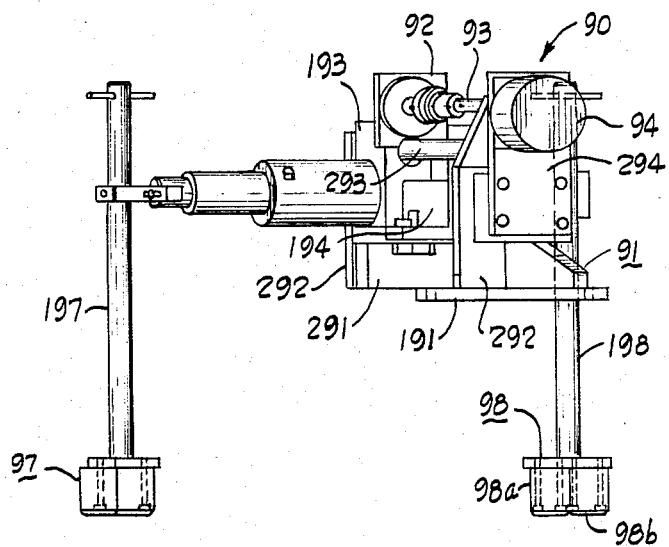
FIG. 12 is a side elevational view of the apparatus of FIG. 11 on the same scale.

An edge sensing unit 90 is provided in connection with an electrical control system to assist in properly locating the panels prior to each splicing operation (see FIGS. 11 and 12). The unit has a rigid cantiliver support 91 including a flat horizontal plate 191 rigidly mounted on the beam 32 (FIG. 13), a horizontal cantilever arm in the form of a bar 291 of rectangular cross-section welded to plate 191 and extending transversely from the beam 32 over the cutter conveyor 14, and a pair of spaced vertical supporting plates 292 welded to plates 191 and 291 which support opposite ends of a horizontal guide rod 293.

A movable carriage 92 is mounted on the rod 293 of the support 91 for adjustment toward or away from the cutter conveyor in accordance with the location of the edge of the tire fabric. The carriage includes blocks 192 and 193 welded to opposite ends of a bar 194 and having outwardly extending portions 195 and 196, respectively. The blocks are slidably mounted on the rod 293 and are moved axially on the rod by a long adjusting screw 93 driven by an electric motor 94 supported on a vertical plate 294. The screw 93 extends through an internally threaded sleeve member 190 that is rigidly attached to block 193 to move the carriage 92 axially in response to rotation of the screw.

The sensing unit 90 has two sensors 97 and 98 supported from the carriage 92 which determine the position of the edges of the fabric panels on the cutter conveyor to control the overlap at the splicer 30. The sensors are supported on vertical rods 197 and 198 in positions a short distance above the panels. As shown the rod 197 is adjustably supported on a horizontal rod member 297 carried by the block 193, and the rod 198 is adjustably supported on the extension 195 of the block 192. Each of said rods may be adjusted to the desired position by turning it about its axis or by moving it vertically.

The sensors 97 and 98 are located generally as indicated in FIGS. 3 and 3A. The sensor 97 acts in response to movement of the trailing edge of the panel b (at aa) as the panel moves from the transfer position T on the cutter conveyor past the splicer 30 to the takeaway unit 40. When the trailing edge passes the sensor 97, a signal is sent to the electric controls to stop the motor drive for roll 46 after the panel moves a predetermined distance so that the trailing edge portion aa is accurately located above the anvil 37 when the panel stops in the splicing position (FIG. 14).

The sensor 98 includes two conventional sensing devices 98a and 98b, one to sense the black rubber of the rubberized tire fabric and the other to sense light. They cause the electric motor 94 to move the carriage 92 until a point between the sensing devices 98a and 98b is in a vertical plane containing the edge of the sheet a (see FIG. 3A). The sensitivity of the sensor 98 depends on its angular position relative to said vertical plane and can be adjusted to provide more precise positioning of the carriage when such adjustment is appropriate.

The edge sensing unit 90 of the present invention makes it possible to provide a high degree of precision in the splicing operation in spite of lack of precision in locating the cut panel b at the transfer position T. The unit can readily compensate for lateral movements of the sheet a in the range of 5 to 15 mm or greater.

In order to produce tires of the highest quality, it is desirable to provide lap splices with a width no greater than that of 2 tire cords. For example, in a tire fabric containing 16 cords per inch, the overlap should be no more than 3 mm (⅛") and is preferably from 1.5 to 2.0 mm. In the practice of this invention the overlap of the portions aa and bb (FIG. 3A) is maintained in the range of from about 1 to about 3 mm and preferably in the range from 1.5 to 2.5 mm. An excessive overlap (i.e., 4 cords or more) affects the quality of the tires and must be avoided.

The equipment shown in FIGS. 1 to 15 and the associated computerized electrical control system eliminate the need for more than one person in operating and maintaining the equipment and in making the necessary adjustments to accommodate changes in the bias angle and in the size of the bias-cut panels. One operator can easily do every required operation. In a typical factory operation, most of his time will be taken up in removing and replacing supply rolls for the cutter conveyor means 10 and in removing storage rolls 120 from the windup unit 100.

The equipment makes it possible for one person using controls at the electrical control panel P (FIGS. 1 and 3) to effect a change in the bias angle and to make angular adjustments in the positions of the cutter 20, the frame F of the takeaway conveyor means 40, and the fabric guiding unit 50 within a few minutes. For example, computer cards or the like may be provided to the operator for automatic adjustment of the bias angle and width of cut for the bias cutter 20 and for automatic angular adjustment of the takeaway conveyor means 40. Also special instructions may be provided, for example with respect to manual adjustments of the unit 50.

An example is given to show how the equipment can be modified and adjusted for a different carcass ply stock. One of the first steps is to open the guides 51 and 52 to full width or enough to accommodate the window shade belt w. Another button at the control panel P is then pushed to select the width of cut, and the electric motor 123 automatically rotates the adjusting screw 23 to cause movement of the trolley 21 of the cutter 20. At the same time the desired bias angle is selected, and the electric motor 225 automatically rotates the adjusting screw 25 to change the angular position of the cutter 20. The electric motor driving the wheel 42a is simultaneously energized to cause the frame F to move with the wheels 42 and to swing to the desired bias angle. Because the guide unit 50 is connected directly to the frame F it swings about the vertical axis p in unison with the takeaway conveyor means 40.

Once the angular position of the parts has been set, the cutter 20 is operated manually to form a cut panel b and the cutter conveyor is operated manually to deliver one panel to the transfer position T while allowing the panel remaining from the previous run to fall onto the floor. A button is then pushed at panel P to effect operation of the electric motor drive of the window shade unit 60 and to feed out the belt w. The operator then grabs hold of the end of the belt w and guides it as he walks toward the festoon unit 45.

I claim:

1. In a process for preparing ply stock in which a continuous sheet of rubber-covered tire cord fabric having evenly spaced longitudinal cords is fed by first conveyor means to an angularly adjustable bias cutter and periodically cut across its width to form panels of a predetermined size and parallogram shape which are transferred from said first conveyor means to a second conveyor means and automatically spliced together at their uncut side portions by a splicer to form a continuous strip of ply stock which is fed by said second conveyor means in a direction parallel to the cut edges of the panels, the improvement which comprises,
    (a) advancing each bias-cut panel from the cutter to a stationary transfer position on said first conveyor means in alignment with said continuous strip, wherein the side portion of the panel is adjacent the trailing side portion of a similar panel held in a stationary splicing position at the end of said strip during such advance,
    (b) splicing said side portions and initiating operation of the cutter while the two panels are in said stationary positions,
    (c) during operation of the cutter, completing the cycle by advancing said continuous strip a short distance in a direction transverse to the longitudinal tire cords to remove the spliced panel from said first conveyor means and to transfer the panel to said stationary splicing position; and
    (d) continually repeating the cycle.

2. A process according to claim 1 in which the trailing side portion of the panel in said splicing position during each cycle overlaps the side portion of the adjacent bias-cut panel in said stationary transfer position and the overlapped portions are adhered together by applying pressure thereto along a narrow zone.

3. A process according to claim 2 in which the location of the uncut side edge of the panel being cut is determined during each cycle and the amount of advancing movement of said second conveyor means is adjusted during each cycle to compensate for changes in the position of said uncut side edge and to maintain the desired overlap at the splicer.

4. In an apparatus for preparing ply stock having first conveyor means for supporting and feeding a continuous sheet of rubber-covered tire cord fabric of uniform width having regularly spaced longitudinal cords, an adjustable bias cutter having means for making parallel cuts in the sheet to sever all of the cords while separating the sheet into panels of a predetermined size and a parallelogram shape, each of which is advanced to a transfer position by said conveyor means, said bias cutter being mounted to swing at least 30 degrees between adjusted positions, second conveyor means for receiving the bias-cut panels including a splicer with means for joining the uncut side portions of said panels to form a continuous strip of ply stock on said second conveyor means, the improvement wherein:
    (a) said splicer is located at the side of said first conveyor means to join the uncut side of the bias-cut panel in said transfer position to a spliced panel in a stationary splicing position on said second conveyor means, whereby each panel in said transfer position is pulled transversely off the first conveyor means and moved to said splicing position by periodic advancement of said ply stock, and
    (b) said second conveyor means is mounted to swing at least 30 degrees between adjusted positions wherein the direction of feed of said ply stock is parallel to the cut edge of each panel.

5. Apparatus according to claim 4, wherein said splicer has a pressure bar mounted to move toward and away from overlapped side portions of adjacent panels and means are provided for moving said bar against the panels during operation of said bias cutter while said adjacent panels and said sheet of tire cord fabric are stationary.

6. Apparatus according to claim 4 wherein a sensing unit is provided near said lap splicer having a rigid base, a carriage mounted on said base to move transversely above a cut panel in said transfer position, motor means for causing movement of said carriage, a first sensor means carried by said carriage above the uncut side edge of a panel in a position to be cut by the bias cutter for controlling said motor means in response to the position of said last-named edge, and second sensor means carried by said carriage in a position above a panel in said transfer position for controlling the movement of the last-named panel to said splicing position in response to the position of the uncut trailing edge to provide a predetermined overlap during the next splicing operation.

7. In an apparatus for preparing carcass ply stock having first conveyor means for supporting and feeding a continuous sheet of rubber-covered tire cord fabric of uniform width having regularly spaced longitudinal cords, an angularly adjustable bias cutter having means for making parallel cuts in the sheet to sever all of the cords while separating the sheet into panels of a predetermined size and a parallelogram shape, second conveyor means for receiving the cut panels including a lap splicer with means for joining the uncut side portions of said panels to form a continuous strip of ply stock on said second conveyor means, the improvement wherein:

(a) said lap splicer is located at the side of said first conveyor means to join the uncut side of the cut panel on said first conveyor means to the continuous ply stock formed by spliced panels on said second conveyor means, whereby each spliced panel is pulled transversely off the first conveyor means by periodic advancement of said ply stock, (b) means are provided for positioning the last spliced panel with its trailing side edge portion overlapping the side edge portion of a previously cut panel resting in a transfer position on said first conveyor means, (c) a pressure bar is mounted on the splicer to move downwardly against said overlapped side edge portions to provide a lap splice, (d) actuating means are provided to move the pressure bar upwardly and downwardly in timed relation to operation of the cutter, and (e) bar means are provided for engaging said trailing side edge portion to lift the same during a portion of each cycle to a position out the path of movement of said previously cut panel.

8. Apparatus according to claim 7 wherein said last-named bar means is mounted adjacent to said pressure bar to move upwardly and downwardly in response to reciprocation of said pressure bar.

* * * * *